(12) United States Patent
Whitlow

(10) Patent No.: US 10,762,794 B2
(45) Date of Patent: Sep. 1, 2020

(54) METHODS AND SYSTEMS FOR AUTOMATION GUIDANCE

(71) Applicant: HONEYWELL INTERNATIONAL INC., Morris Plains, NJ (US)

(72) Inventor: Stephen Whitlow, St. Louis Park, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 202 days.

(21) Appl. No.: 15/269,089

(22) Filed: Sep. 19, 2016

(65) Prior Publication Data

US 2018/0082596 A1   Mar. 22, 2018

(51) Int. Cl.
  *G08G 5/00* (2006.01)
  *G05D 1/00* (2006.01)
  *G01D 1/02* (2006.01)

(52) U.S. Cl.
  CPC ......... *G08G 5/0039* (2013.01); *G05D 1/0088* (2013.01); *G08G 5/0013* (2013.01);
  (Continued)

(58) Field of Classification Search
  CPC ..... G05D 1/0088; G05D 1/101; G08G 5/0082
  (Continued)

(56) References Cited

U.S. PATENT DOCUMENTS 5,978,715 A    11/1999   Briffe et al.
6,122,572 A *   9/2000   Yavnai ................. G05D 1/0088
                                                                342/13
(Continued)

FOREIGN PATENT DOCUMENTS

EP    2650858 A2    10/2013
EP    2709084 A2     3/2014

OTHER PUBLICATIONS

Centralized path planning for unmanned aerial vehicles with a heterogeneous mix of sensors; Kutluyil Doğançay; Hatem Hmam; Samuel P. Drake; Anthony Finn; 2009 International Conference on Intelligent Sensors, Sensor Networks and Information Processing, 2009, pp. 91-96 (Year: 2009).*

(Continued)

*Primary Examiner* — Cuong H Nguyen
(74) *Attorney, Agent, or Firm* — Lorenz & Kopf, LLP

(57) ABSTRACT

Methods and systems are provided for operating a vehicle that supports an automated action, such as an aircraft supporting autopilot, autothrottle, and various other autonomous operations and operating modes. One exemplary method of operating a vehicle involves obtaining one or more user inputs pertaining to an automated action to be performed by an onboard system, obtaining current vehicle status information, determining an operational objective for the automated action based at least in part on the current status information and the one or more user inputs, and providing guidance information pertaining to the automated action in a manner that is influenced by the operational objective and the current status information. For example, the guidance information may include indication of a remedial action to resolve a discrepancy between the operational objective and a projected aircraft behavior in the context of the operational objective or the current vehicle status.

20 Claims, 4 Drawing Sheets

(52) U.S. Cl.
CPC ......... *G08G 5/0021* (2013.01); *G08G 5/0047* (2013.01); *G01D 1/02* (2013.01)

(58) Field of Classification Search
USPC ........ 701/3, 23, 36, 532, 14, 34.3, 119, 121; 342/13; 340/945; 455/557
See application file for complete search history.

(56) References Cited

U.S. PATENT DOCUMENTS

| | | | |
|---|---|---|---|
| 6,272,477 B1 | 8/2001 | Kelly, III et al. | |
| 6,792,363 B1* | 9/2004 | Bye ...................... | G05D 1/0005 701/2 |
| 7,343,232 B2* | 3/2008 | Duggan ............... | G05D 1/0061 244/75.1 |
| 7,693,624 B2* | 4/2010 | Duggan ............... | G05D 1/0061 244/75.1 |
| 7,787,999 B1 | 8/2010 | Barber | |
| 8,000,844 B2* | 8/2011 | Mottura ............... | G05D 1/0055 340/945 |
| 8,068,949 B2* | 11/2011 | Duggan ............... | G05D 1/0061 244/75.1 |
| 8,068,950 B2* | 11/2011 | Duggan ............... | G05D 1/0061 244/75.1 |
| 8,082,070 B2 | 12/2011 | Gunn et al. | |
| 8,082,074 B2* | 12/2011 | Duggan ............... | G05D 1/0061 244/75.1 |
| 8,380,367 B2* | 2/2013 | Schultz ................. | G01C 21/00 340/945 |
| 8,761,971 B2* | 6/2014 | Gershzohn ............ | G05D 1/101 340/971 |
| 8,774,851 B2* | 7/2014 | Mirbaha ............. | H04L 67/2838 455/518 |
| 9,132,912 B2* | 9/2015 | Griffith .................. | B64C 19/00 |
| 2005/0004723 A1* | 1/2005 | Duggan ............... | G05D 1/0061 701/24 |
| 2006/0208169 A1* | 9/2006 | Breed .................... | B60N 2/002 250/221 |
| 2007/0244639 A1 | 10/2007 | Butterworth et al. | |
| 2008/0177994 A1* | 7/2008 | Mayer .................. | G06F 9/4418 713/2 |
| 2009/0087029 A1* | 4/2009 | Coleman ............ | G06K 9/00208 382/103 |
| 2009/0125163 A1* | 5/2009 | Duggan ............... | G05D 1/0061 701/2 |
| 2010/0250022 A1* | 9/2010 | Hines ..................... | G05D 1/101 701/2 |
| 2010/0292873 A1* | 11/2010 | Duggan ............... | G05D 1/0061 701/11 |
| 2010/0292874 A1* | 11/2010 | Duggan ............... | G05D 1/0061 701/11 |
| 2011/0040431 A1* | 2/2011 | Griffith ................ | G05D 1/0661 701/15 |
| 2012/0202551 A1* | 8/2012 | Mirbaha ................ | H04W 4/08 455/518 |
| 2013/0179009 A1* | 7/2013 | Gershzohn ............ | G05D 1/101 701/3 |
| 2013/0271300 A1* | 10/2013 | Pepitone ............ | G01C 23/005 340/972 |
| 2013/0274965 A1* | 10/2013 | Griffith ................ | G05D 1/0661 701/15 |
| 2017/0015405 A1* | 1/2017 | Chau ....................... | B64C 13/06 |

OTHER PUBLICATIONS

Autonomous path tracking and disturbance force rejection of UAV using fuzzy based auto-tuning PID controller,Theerasak Sangyam et al., ECTI-CON2010: The 2010 ECTI Int Confernce on Electrical Engineering/Electronics, Computer, Telecommunications and Info Technology, 2010, pp. 528-531. (Year: 2010).*

Extended EP Search Report for Application No. 17190981.5 dated Jan. 31, 2018.

\* cited by examiner

METHODS AND SYSTEMS FOR AUTOMATION GUIDANCE

TECHNICAL FIELD

The subject matter described herein relates generally to vehicle systems, and more particularly, embodiments of the subject matter relate to aircraft systems capable of intelligently providing guidance regarding automation behavior by accounting for operational objectives.

BACKGROUND

Various forms of automation have been incorporated into vehicles to improve operations and reduce stress, fatigue, and other potential contributing factors for human error. For example, many modern aircraft incorporate a flight management system (FMS) and other avionics systems capable of providing autopilot functionality and other automated vehicle operations. As operational requirements are added, avionics providers typically add additional modes rather than redesigning and recertifying the automation, which may be cost prohibitive, which, in turn, results in complicated automation. Moreover, aviation automation is typically strong and silent and can be difficult to understand because the underlying decision rationale and logic may not be apparent to the pilot. This may result in poor mental models of the automation and other behavioral or operational issues. Accordingly, it is desirable to improve a vehicle operator's understanding of the automation behavior.

BRIEF SUMMARY

Methods and systems are provided for operating a vehicle, such as an aircraft. One exemplary method or operating a vehicle involves obtaining, by a processing system, one or more user inputs pertaining to the programming of an automated action or other automation behavior, obtaining, by the processing system, current status information for the vehicle, determining, by the processing system, an operational objective based at least in part on the current status information and the one or more user inputs, and providing, by the processing system via a user interface, guidance information pertaining to the initiation or continuation of the automated action in a manner that is influenced by the operational objective and the current status information.

Another embodiment of a method of operating an aircraft is provided. The method involves obtaining, by a processing system, one or more user inputs for programming an automated action to be performed by a system onboard the aircraft, obtaining, by the processing system, current status information for the aircraft, determining, by the processing system, a pilot objective based at least in part on the current status information and the one or more user inputs for the automated action, determining, by the processing system, a projected aircraft behavior resulting from the one or more user inputs for the automated action based at least in part on the current status information and the initiation or continuation of the aircraft behavior according to the one or more user inputs, and in response to identifying a difference between the projected aircraft behavior and the pilot objective, providing indication of a remedial action to resolve the difference in the context of the pilot objective.

In another embodiment, an aircraft system is provided. The aircraft system includes a first system onboard an aircraft capable of performing an automated action by autonomously adjusting a mechanical or electrical configuration of an onboard component to influence operation of the aircraft, a second system onboard the aircraft to provide current status information for the aircraft, one or more user input devices to receive one or more user inputs for the automated action, an output device, and a processing system coupled to the second system, the one or more user input devices, and the output device. The processing system is configured to determine a pilot objective based on the current status information and the one or more user inputs for programming the automated action, determine a projected aircraft behavior resulting from the one or more user inputs for the automated action based at least in part on the current status information and the one or more user inputs, and provide, via the output device, indication of a remedial action to resolve a difference between the projected aircraft behavior and the pilot objective.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
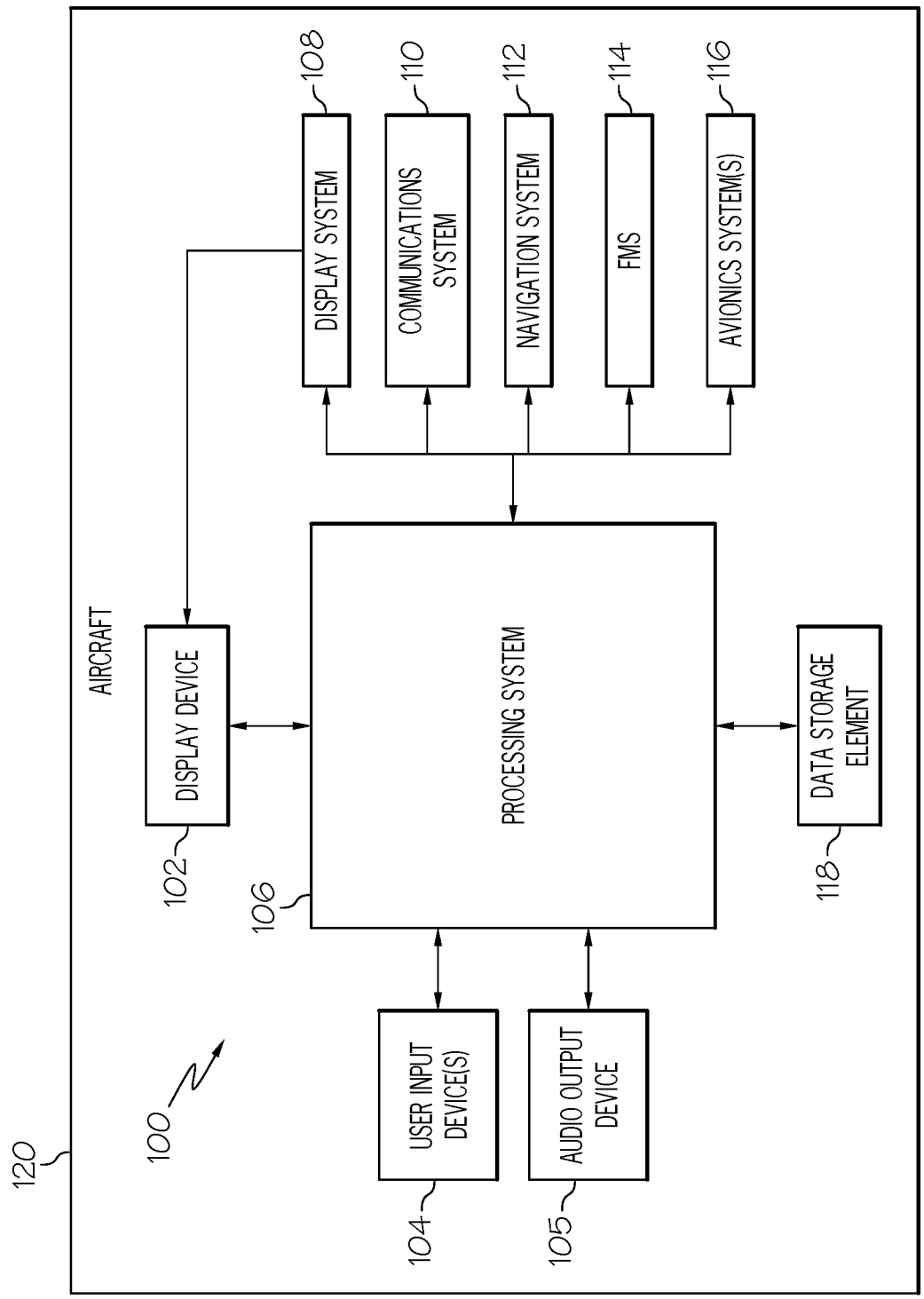
FIG. 1 is a block diagram of a system for an aircraft in an exemplary embodiment.

Embodiments of the subject matter described herein generally relate to systems and methods for providing guidance information pertaining to an automated vehicle action to a vehicle operator in a manner that is influenced by the likely operational objective for the vehicle operator and the current vehicle status. As used herein, automated action should be understood as referring to any action that involves one or more onboard systems autonomously adjusting a mechanical or electrical configuration of an onboard component to influence the vehicle's trajectory, path, speed, or other aspect of the vehicle's travel. In this regard, the automated action may be a standalone feature or a feature of an autonomous mode supported by an onboard system. While the subject matter described herein could be utilized in various applications or in the context of various different types of vehicles (e.g., automobiles, marine vessels, trains, or the like), exemplary embodiments are described herein in the context of providing guidance information to a pilot, co-pilot, or other operator of an aircraft.

As described in greater detail below in the context of FIGS. 2-4, the user input(s) pertaining to programming or otherwise configuring an automated action and information characterizing the current vehicle status are utilized to determine an operational objective corresponding to that user input(s). In other words, based on the current aircraft status (e.g., the current location within the flight plan, the current location relative to a departure location, destination location or other milestone or waypoint, the current phase of flight, and/or the like) and the input(s) made by a pilot attempting to initiate, configure or otherwise engage an automated action (e.g., the number, type and/or content of the inputs, the type of automated action being attempted, the identification or type of onboard system being sought to perform the automated action, and/or the like), a likely operational objective of the pilot is determined given the current aircraft status and attempted automated action. When the automated action cannot be performed according to the pilot's input(s) or the projected result of the automated action does not align with the likely objective, the pilot's operational objective is utilized to provide guidance that facilitates the pilot achieving that operational objective and/or enabling the automated action to achieve the desired result according to the pilot's input(s). Thus, the logic or rationale underlying the automation behavior can be conveyed to the pilot in a manner that is aligned with the pilot's objectives, thereby facilitating an improved mental model of the automation decision-making with respect to operational objectives and the current aircraft status. As a result, the subject matter described herein may reduce the likelihood of the development of superstitious behaviors or operational errors on behalf of the pilot with respect to aircraft operations, or potential degradations to the pilot's situational awareness due to failure of the automation to effectuate the pilot's input(s) (e.g., by the automation response distracting or otherwise commanding the pilot's attention).

For example, many aircraft include a vertical navigation (VNAV) automation feature that automatically controls the vertical situation of the aircraft to climb or descend to a particular altitude. A pilot may make inputs intended to engage the vertical navigation feature prior to reaching the top of descent (TOD) point but fail to provide a lower target altitude in the altitude selector (ASEL). Based on the pilot's inputs indicating an attempt to engage the vertical navigation feature and the current status of the aircraft being in the cruise flight phase and within a threshold distance of the TOD point and/or the destination airport defined by the flight plan, the subject matter described herein determines the likely operational objective of the pilot is to initiate descent.

The automation behavior is also analyzed to determine the projected or anticipated aircraft behavior in response to the pilot inputs and/or determine whether one or more preconditions for engaging the automated action are satisfied. In response to determining that the projected aircraft behavior is to maintain the current altitude and does not match the pilot's operational objective, the aircraft performance data and other preconditions are analyzed according to the automation model. In response to determining that the aircraft performance data is complete and valid, it may be determined that the discrepancy causing the projected aircraft behavior to deviate from the pilot's operational objective is that a lower target altitude has not been entered in the altitude selector. Accordingly, guidance information may be provided that explains the remedial action the pilot needs to take in the context of the pilot's operational objective, for example, by providing an indication, notification, or reminder to the pilot to input a lower target altitude into the altitude selector (e.g., "lower ASEL to descend"). Depending on the embodiment, the guidance information could be auditory (e.g., provided via a speaker, headset, or other audio output device), visual (e.g., by displaying the guidance information on a display device, activating or illuminating appropriate cockpit indicators, or the like), or a combination thereof.

As another example, the pilot may make inputs intended to engage the vertical navigation to comply with a clearance provided from air traffic control (ATC). For example, the aircraft may receive a clearance from ATC, either via a data link or auditory means, such as, for example, "climb to 12000 FT MSL and proceed direct to ABC," where ABC represents the name of a navigational reference point. Accordingly, the pilot may manipulate the altitude selector to enter a target altitude of 12,000 feet. Based on the received ATC clearance and the pilot inputs matching or otherwise corresponding to at least a portion of the ATC clearance, it may be determined that the pilot's operational objective for the automated action is to comply with the ATC clearance. However, the pilot may have failed to program the flight management system (FMS) to proceed direct to the specified waypoint ABC. The projected behavior of the aircraft may be determined that the aircraft will climb to 12,000 feet but along the current heading or previously specified route of travel. After determining other preconditions for the automated action is satisfied, it may be determined that the discrepancy causing the projected aircraft behavior to deviate from the pilot's operational objective of complying with the ATC clearance is that the pilot has failed to program the FMS to proceed direct to waypoint ABC. Again, guidance information may be provided that explains the remedial action the pilot needs to take for the automated action to comply with the ATC clearance, for example, by providing an indication, notification, or reminder to the pilot to input the destination waypoint (e.g., "go Direct To ABC").

As yet another example, in practice, an automation behavior may silently stop providing automation support (e.g., by an avionics system ceasing an automated action) that the pilot expects to continue. For example, a pilot may inadvertently move a control element to a position that causes an automation behavior to become disabled. As one example, a pilot inadvertently moving a throttle control may cause airspeed protection in a flight level change mode currently executing a flight level change at a selected airspeed to become disabled. In other words, the autothrottle logic associated with the automated mode may assume that the pilot no longer wants airspeed protection. In embodiments described herein, the pilot's objective for the automated mode may be initially determined based on a correlation between a likely objective at the current flight phase at the current location within the flight plan and the user inputs programming the flight level change mode, and thereby identified as maintaining safe airspeed and altitude to a runway threshold to support a safe landing. In response to the throttle control being manipulated, the throttle control position may be monitored to detect or otherwise identify an objective to provide manual thrust control. Absent such a determination in the case of an inadvertent movement of the throttle control, the operational objective for the automated action may be persisted as maintaining safe airspeed and altitude to the runway threshold according to the original inputs programming the flight level change mode. In response to the flight level change mode disabling the automated airspeed protection, a discrepancy between the pilot's objective and the automation behavior may be identified, and corresponding guidance may be provided to the pilot indicating that the automated airspeed protection has been disabled and needs to be reprogrammed or reengaged with the throttle control being repositioned accordingly.

FIG. 1 depicts an exemplary embodiment of a system 100 which may be utilized with a vehicle 120, such as an aircraft. In an exemplary embodiment, the system 100 includes, without limitation, a display device 102, one or more user input device(s) 104, an audio output device 105, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In the illustrated embodiment of FIG. 1, the display device 102 is coupled to the display system 108 and the processing system 106, with the processing system 106 and the display system 108 being cooperatively configured to display, render, or otherwise convey one or more graphical representations or images associated with operation of the aircraft 120 on the display device 102, such as for example, lateral map displays or other navigational maps, synthetic or perspective displays, vertical profile or vertical situation displays, and the like.

The user input device 104 is coupled to the processing system 106, and the user input device 104 and the processing system 106 are cooperatively configured to allow a user (e.g., a pilot, co-pilot, or crew member) to interact with the display device 102 and/or other elements of the aircraft system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

It should be appreciated that in practice, the aircraft 120 will likely include numerous different types of user input devices 104 onboard in the cockpit of the aircraft 120, and the number and type of user input devices may vary depending on the make of the aircraft 120, the model of the aircraft 120, the operator of the aircraft 120, and potentially other factors. Accordingly, the subject matter described herein is not limited to any particular type, number, or configuration of user input devices 104. Moreover, in various embodiments, one or more user input devices 104 may be communicatively coupled to one or more other systems 108, 110, 112, 114, 116 onboard the aircraft 120, either in parallel with or independently of the processing system 106, and in some embodiments, the processing system 106 may receive user inputs indirectly via one or more other systems 108, 110, 112, 114, 116 onboard the aircraft 120.

The audio output device 105 is coupled to the processing system 106, and the audio output device 105 and the processing system 106 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art. Again, it should be appreciated that in practice, the aircraft 120 may include numerous different types of audio output devices 105 onboard in the cockpit of the aircraft 120, and the number and type of audio output devices may vary depending on the make, the model, and/or the operator of the aircraft 120, and potentially other factors, and as such, the subject matter described herein is not limited to any particular type, number, or configuration of audio output devices 105. Moreover, in various embodiments, one or more audio output devices 105 may be communicatively coupled to one or more other systems 108, 110, 112, 114, 116 onboard the aircraft 120, either in parallel with or independently of the processing system 106, and in some embodiments, the processing system 106 may provide outputs to such audio output devices 105 indirectly via one or more other systems 108, 110, 112, 114, 116 onboard the aircraft 120.

The processing system 106 generally represents the hardware, circuitry, processing logic, and/or other components configured to facilitate communications and/or interaction between the elements of the system 100 and perform additional processes, tasks and/or functions to support operation of the system 100, as described in greater detail below. Depending on the embodiment, the processing system 106 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 106 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 106, or in any practical combination thereof. In accordance with one or more embodiments, the processing system 106 includes or otherwise accesses a data storage element 118, such as a memory or another suitable non-transitory short or long term storage media capable of storing computer-executable programming instructions or other data for execution that, when read and executed by the processing system 106, cause the processing system 106 to execute and perform one or more of the processes, tasks, operations, and/or functions described herein. Depending on the embodiment, the data storage element 118 may be physically realized using RAM memory, ROM memory, flash memory, registers, a hard disk, or another suitable data storage medium known in the art or any suitable combination thereof.

In some embodiments, when one of the input devices 104 is realized as an audio input device, the processing system 106 implements a speech recognition engine (or voice recognition engine) and/or speech-to-text system adapted to receive audio input from a user. In such embodiments, the processing system 106 may also include various filters, analog-to-digital converters (ADCs), digital-to-analog converters (DACs), speech synthesizers, and the like, which are suitably configured to support operations of the aircraft system 100 (e.g., receiving auditory input from the user input device 104 or providing auditory feedback via the audio output device 105).

The display system 108 generally represents the hardware, circuitry, processing logic, and/or other components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude (or above ground level) for the aircraft 120. The navigation system 112 is also capable of obtaining or otherwise determining the heading of the aircraft 120 (i.e., the direction the aircraft is traveling in relative to some reference).

In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. It should be noted that although FIG. 1 depicts a single avionics system 116, in practice, the aircraft system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the aircraft system 100 and/or aircraft 120 will likely include one or more of the following avionics systems suitably configured to support operation of the aircraft 120: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In one or more embodiments, the FMS 114 includes or otherwise accesses a data storage element (e.g., data storage element 118) storing computer-executable programming instructions or other data for execution that, when read and executed by the FMS 114, cause the FMS 114 to create, generate, or otherwise facilitate an autopilot module configured to support autonomous operation of the aircraft 120 and support other automated actions or operations of the aircraft 120 in conjunction with the avionics systems 116. For example, the data storage element 118 may include data or information utilized by the FMS 114 to model flight characteristics of the aircraft 120, construct or otherwise generate flight paths for the aircraft 120, determine corresponding thrust setting(s) for the aircraft 120, and the like.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the aircraft system 100 (e.g., via a data link and/or communications system 110). In this regard, in some embodiments, the display device 102, the user input device 104, the audio output device 105, and/or the processing system 106 may be implemented as an electronic flight bag that is separate from the aircraft 120 but capable of being communicatively coupled to the other elements of the aircraft system 100 when onboard the aircraft 120. Similarly, in some embodiments, the data storage element 118 may be located outside the aircraft 120 and communicatively coupled to the processing system 106 via a data link and/or communications system 110. Furthermore, practical embodiments of the aircraft system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114, that is, the processing system 106 may be a component of the FMS 114.

Figure 2:
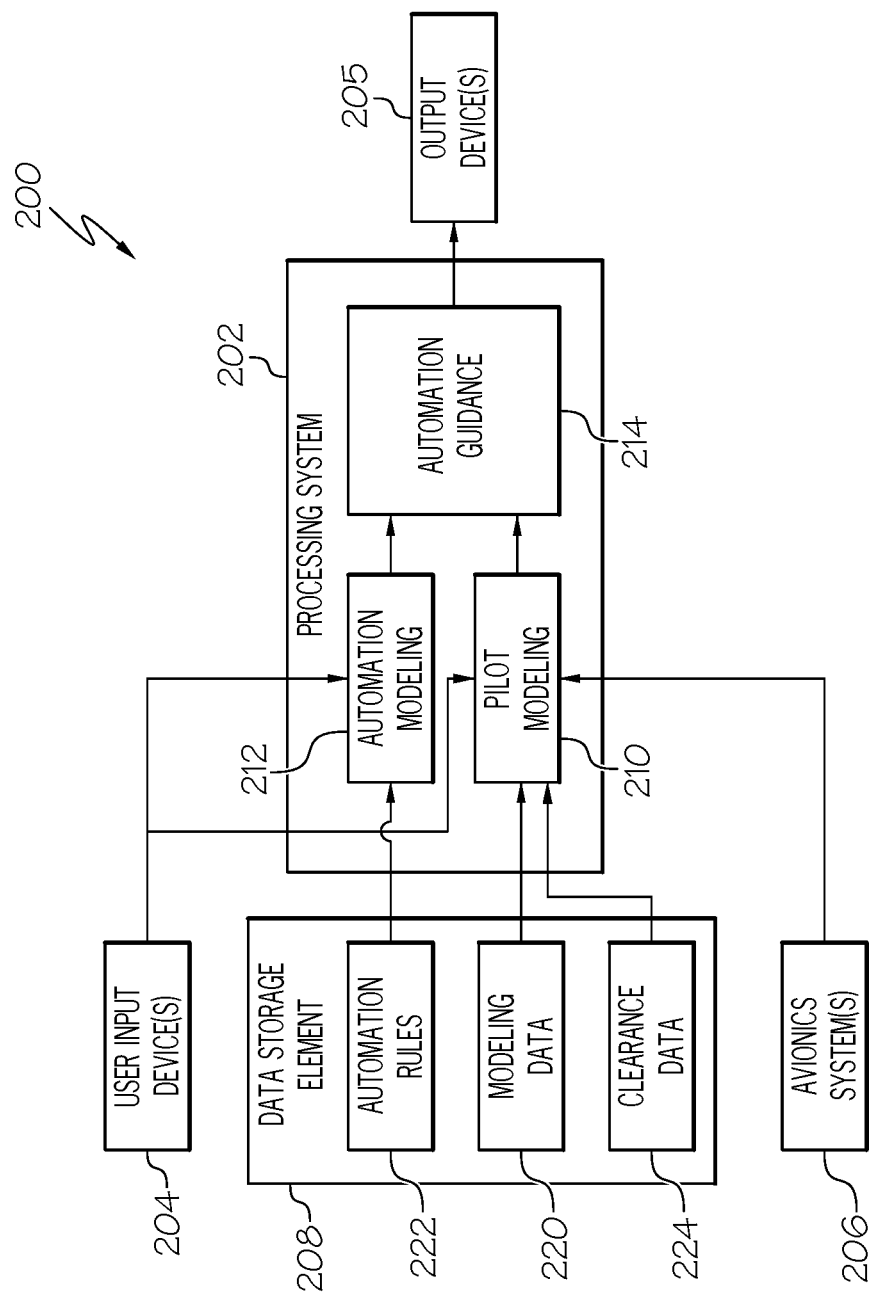
FIG. 2 is a block diagram of an automation guidance system suitable for implementation by or in conjunction with the aircraft system of FIG. 1 in accordance with one or more exemplary embodiments.

FIG. 2 depicts an exemplary embodiment of an automation guidance system 200 suitable for implementation by a vehicle system, such as the aircraft system 100 of FIG. 1. The illustrated automation guidance system 200 includes a processing system 202 coupled to one or more user input devices 204 (e.g., user input device(s) 104), one or more output devices 205 (e.g., display device 102 and/or audio output device 105), one or more avionics systems 206 (e.g., avionics systems 116), and a data storage element 208 (e.g., data storage element 118). The processing system 202 may be a standalone component (e.g., processing system 106) or integrated with the FMS 114 or another component of the aircraft system 100.

The processing system 202 may include or otherwise be realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, configured to perform the functions described herein. In exemplary embodiments, the processing system 202 or the data storage element 208 include computer-executable programming instructions or other data for execution that, when read and executed by the processing system 202, cause the processing system 202 to create, generate, or otherwise facilitate a pilot modeling application 210 that determines a pilot's operational objective, an automation modeling application 212 that analyzes the automation response to received user input(s), and an automation guidance application 214 that generates guidance for remedying discrepancies between the automation response and the pilot's operational objective, as described in greater detail below.

In exemplary embodiments, the data storage element 208 stores or otherwise maintains pilot objective modeling data 220, which, in turn, is utilized by the pilot modeling application 210 to determine a likely pilot objective for user input(s) from the user input device(s) 204 based on those received user input(s) and current aircraft status information from the avionic(s) systems 206. In this regard, the pilot objective modeling data 220 may include historical data for one or more previous flights that maintains associations between previously received user input(s) and the corresponding segment or phase of the flight during which the user input(s) was received, navigational reference points or milestones within the flight plan or distances relative thereto when the user input(s) was received, aircraft configuration data or other data characterizing or quantifying the current status of one or more onboard systems when the user input(s) was received, and the like, along with the resultant automated action that the user input(s) initiated. Thus, the historical data characterizes historical patterns of pilot and aircraft behavior which may be utilized to create a nominal representation or model of typical pilot inputs and corresponding automated actions temporally or spatially in the context of a flight plan. In various embodiments, the pilot objective modeling data 220 may be pilot-specific (e.g., a different set of data for each pilot and dependent on the pilot currently operating the aircraft 120), aircraft-specific (e.g., different sets of data for different aircraft makes and models), flight plan or route-specific (e.g., a set of data corresponding to a defined route or flight plan across different pilots and/or aircrafts), or the like.

The illustrated embodiment of the data storage element 208 also includes air traffic control clearance data 224, which may also be utilized to by the pilot modeling application 210 to determine the likely pilot objective, as described in greater detail below in the context of FIG. 3. In this regard, the likely objective for the automated action being engaged or initiated by the pilot via the received user input(s) may be determined using historical data while also taking into account the current operational context of the aircraft 120 reflected by the current aircraft status information and the current or most recent clearance. For example, in some embodiments, operational criteria or other relevant portions of clearance instructions or commands received from an air traffic controller via the communications system 110, 206 may be automatically stored or otherwise maintained in the data storage element 118, 208, either by the processing system 106, 202 parsing a data link message or using speech recognition to discern, identify, and store the corresponding clearance criteria in the data storage element 118, 208 as clearance data 224. In one or more embodiments, the clearance data 224 is associated with a timestamp corresponding to when the clearance criteria were received, thereby indicating the temporal difference or relationship between when the clearance instructions were received by the pilot and when the user input(s) were made, which, in turn, may be utilized when determining the likely pilot objective. In this regard, in some embodiments, the historical modeling data 220 may also include historical clearance data and corresponding timing information, which, in turn, allows for the operational objective to be determined in a manner that is influenced by the relative delay between when a clearance is received and when the user inputs are made. For example, a relatively short delay between when a clearance is received and when the user inputs are initiated (e.g., a time difference less than a threshold value) may be indicative of or correlative to user inputs attempting to effectuate the clearance, whereas a longer delay (e.g., a time difference greater than a threshold value) may indicate that the clearance data is no longer correlative to the pilot inputs and therefore should be given less weight in determining the pilot's objective.

In the illustrated embodiment, the data storage element 208 also stores or otherwise maintains automation rules 222, which, in turn, are utilized by the automation modeling application 212 to determine whether any conditional requirements for the initiated automated action are satisfied and determine the projected or anticipated aircraft behavior based on the user inputs. In this regard, the automation rules 222 may define criteria that may be utilized to restrict or limit a particular automated action from being performed, such as, for example, a particular aircraft status, a particular type or sequence of user inputs, or the like. Based on the automation rules 222, the automation modeling application 212 determines whether any prerequisites for an automated action are not satisfied, and if so, provides indication of what (if any) criteria associated with the automated action are unsatisfied to the automation guidance application 214. The automation modeling application 212 also determines what the anticipated outcome or result of the automated action is likely to be based on the user inputs and the current aircraft status, and the automation modeling application 212 outputs or otherwise provides indication of the projected aircraft behavior to the automation guidance application 214.

In one or more embodiments, the automation guidance application 214 compares or otherwise analyzes the pilot's operational objective output by the pilot modeling application 210 and the projected aircraft behavior output by the automation modeling application 212 to identify whether any potential discrepancies exist between the pilot's operational objective and the projected aircraft behavior, that is, whether the projected aircraft behavior matches or aligns with the pilot's operational objective. When the automation guidance application 214 identifies the projected aircraft behavior does not satisfy or otherwise align with the pilot's operational objective, the automation guidance application 214 identifies the cause of the discrepancy, and if possible, identifies one or more remedial actions for resolving the discrepancy. In this regard, the automation guidance application 214 also analyzes what (if any) criteria for the automated action are not satisfied. When the one or more criteria associated with the automated action are unsatisfied, the automation guidance application 214 generates guidance that indicates the unsatisfied criteria to the pilot in the context of the pilot's operational objective. Conversely, when the criteria associated with the automated action are satisfied, the automation guidance application 214 analyzes the user input(s) and/or the current aircraft status to ascertain the cause of the discrepancy and generates corresponding guidance information that indicates the cause of the discrepancy to the pilot in the context of the pilot's operational objective. For example, if the pilot's operational objective is to descend from the current aircraft altitude and the projected aircraft behavior is to maintain or climb from the current aircraft altitude, the automation guidance application 214 may provide guidance to the pilot that the input target altitude may be incorrect, that some other aspect of the current aircraft status may be preventing a descent (e.g., due to another autonomous mode or automated action overriding the pilot input), or that some other constraint may be preventing a descent (e.g., flight envelope protection or other lower level system constraints).

Figure 3:
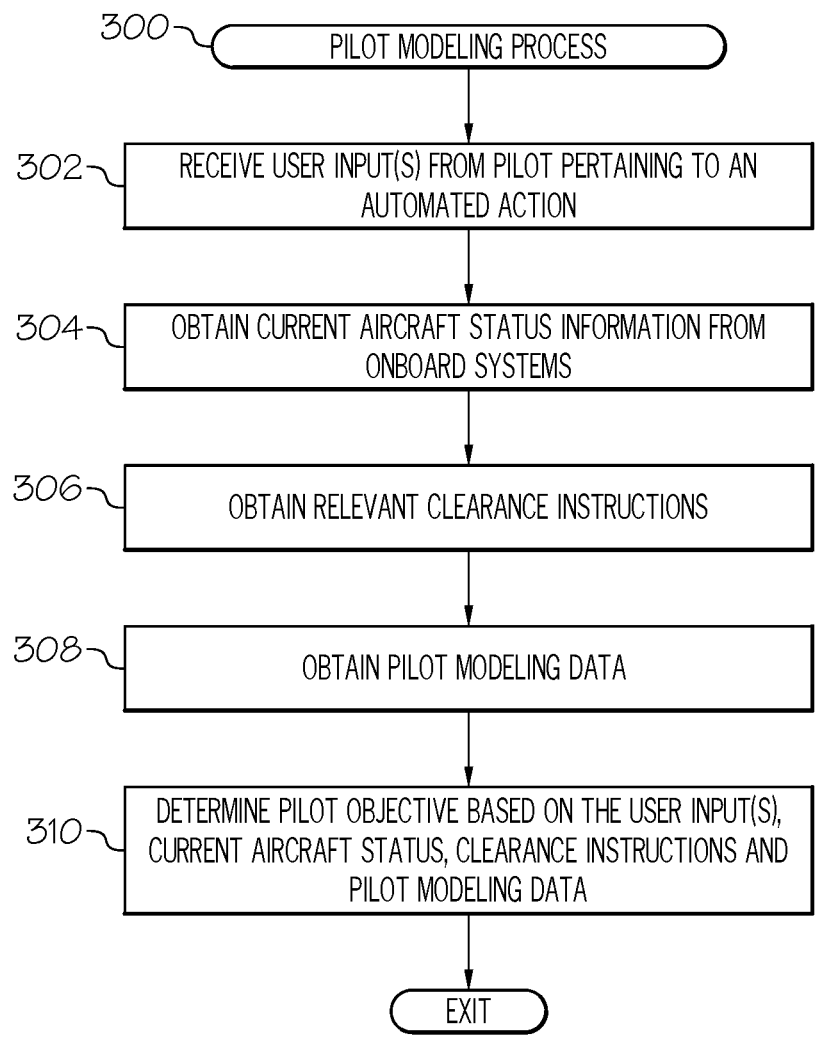
FIG. 3 is a flow diagram of an exemplary pilot modeling process suitable for use with the aircraft system of FIG. 1 or the automation guidance system of FIG. 2 in accordance with one or more embodiments.

Referring now to FIG. 3, in an exemplary embodiment, the system 100 and/or the automation guidance system 200 is configured to support a pilot modeling process 300 and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the pilot modeling process 300 may be performed by different elements of the systems 100, 200; that said, for purposes of explanation, the pilot modeling process 300 may be described herein primarily in context of being performed primarily by the FMS 114 and/or the processing system 106, 202, and in particular, by a pilot modeling application 210 executed, generated, or otherwise implemented thereby. It should be appreciated that the pilot modeling process 300 may include any number of additional or alternative tasks, the tasks need not be performed in the illustrated order and/or the tasks may be performed concurrently, and/or the pilot modeling process 300 may be incorporated into a more comprehensive procedure or process having additional functionality not described in detail herein. Moreover, one or more of the tasks shown and described in the context of FIG. 3 could be omitted from a practical embodiment of the pilot modeling process 300 as long as the intended overall functionality remains intact.

The pilot modeling process 300 initiates or begins in response to receiving one or more user inputs pertaining to an automated action that the pilot would like to activate, configure, engage, or otherwise initiate, that is, the inputs associated with the pilot's attempt to program or otherwise configure the automation behavior of an onboard system (task 302). In this regard, pilot modeling process 300 obtains one or more of the content of the user input(s), the number or amount of user input(s), and/or the type of user input(s) along with information or data characterizing or defining the context of the user input(s), such as, for example, the type of automated action being attempted or invoked, the identification or type of onboard system being sought to perform the automated action, and the like. Thus, the pilot modeling application 210 identifies the user input device(s) 104, 204 interacted with by the pilot and the onboard system(s) 108, 110, 112, 114, 116 corresponding thereto along with obtaining the content or state of those user input device(s) 104, 204 and the corresponding input values. For example, if the user input device 104, 204 is a rotary knob having discrete states or positions, the pilot modeling application 210 identifies the state or position of the knob and the corresponding input value. In this manner, information or data characterizing, quantifying, or otherwise qualifying the programming being attempted by the pilot is obtained for analysis of the pilot's likely operational objective in conjunction with the current aircraft status.

Still referring to FIG. 3, the pilot modeling process 300 continues by receiving or otherwise obtaining current status information for the aircraft that is contemporaneous with, concurrent to, or otherwise temporally associated with the user inputs (task 304). The current status information pertaining to the aircraft 120 generally represents the instantaneous, real-time or most recent available values for one or more parameters that quantify or characterize the current operation of the aircraft 120. In exemplary embodiments, the current status information includes information characterizing or defining the current aircraft status in the context of the overall flight, such as, for example, the current location of the aircraft within the flight plan or other predefined route of travel, the current location of the aircraft relative to the departure location, the planned destination location or other flight milestone or navigational reference point of interest, the current altitude of the aircraft, the current airspeed and vertical speed of the aircraft, the current phase of flight, and/or the like. For example, the pilot modeling application 210 may obtain (e.g., from FMS 114, navigation system 112 and/or other avionic systems 116) one or more of the following: the current flight phase for the aircraft 120, the current location of the aircraft 120 (or a particular distance from a navigational reference point or a desired track), the current altitude (or above ground level) of the aircraft 120, the current heading (or bearing) of the aircraft 120, the current amount of fuel remaining onboard the aircraft 120, the current engine status (e.g., whether any engine is disabled, whether afterburners are in operation, the current revolutions per minute, and/or the like), the current aircraft configuration (e.g., the current flap configuration). When the onboard avionics systems 116 include a detection system, the pilot modeling application 210 may obtain current meteorological conditions detected at or near the current location of the aircraft 120 (e.g., the current temperature, wind speed, wind direction, atmospheric pressure, turbulence, and the like), the current air traffic or other obstacles detected at or near the current location of the aircraft 120, and the like. The current aircraft status information may also include the current status or configuration of one or more autonomous operating modes or automated actions supported by the onboard systems, such as, for example, indication of what operating modes are currently active, what automated actions are currently active or in the process of being performed, and the like.

The illustrated pilot modeling process 300 also identifies or obtains any clearance instructions or data that may be relevant to the user inputs (task 306). For example, the pilot modeling application 210 may access the data storage element 208 to obtain the clearance data 224 corresponding to the clearance instructions most recently received by the aircraft 120 from air traffic control. In some embodiments, the pilot modeling application 210 filters or otherwise excludes the clearance data 224 using the timestamps associated with the clearance data 224 to remove from consideration any clearance instructions that were not received within a threshold amount of time of the pilot inputs. In other words, in some embodiments, the pilot modeling process

300 only obtains and considers clearance instructions received within a threshold amount of time of the current time associated with the user inputs.

The pilot modeling process 300 continues by retrieving or otherwise obtaining historical or nominal pilot modeling data and identifying or otherwise determining a likely pilot operational objective based on the received user inputs, the current aircraft status, and any relevant clearance instructions using the pilot modeling data (task 308, 310). In this regard, as described above, the pilot modeling data 220 stored by the data storage element 118, 208 may be utilized to establish a correlation between user inputs, aircraft status, clearance instructions, and a corresponding aircraft behavior that the pilot is likely to achieve. In some embodiments, the pilot modeling application 210 utilizes machine learning to determine which combination of user inputs, aircraft status, and clearance instructions are most strongly correlated to or predictive of a particular operational objective, such that the pilot modeling application 210 is capable of mapping user inputs, current aircraft status, and clearance instructions to a particular operational objective. In other embodiments, the pilot modeling application 210 utilizes a rule-based approach to determine what the pilot's most likely operational objective for the user input is given the current aircraft status and the clearance instructions. Thus, the pilot modeling application 210 may apply one or more rules using the current aircraft location within the flight plan, the current flight phase, the current state of various onboard systems 108, 110, 112, 114, 116, and any clearance instructions to identify an initial subset of one or more operational objectives likely to be intended by the pilot. Based on the modeling data 220, the pilot modeling application 210 may then select or otherwise identify a most likely operational objective from within that subset based on the historical or nominal behavior pattern for the current pilot and/or across other pilots.

It should be noted that in practice, the modeling data 220 may be specific to a particular type of aircraft and/or a particular configuration thereof. For example, each make and model of an aircraft have a unique set of modeling data 220 associated with that particular type of aircraft for each potential combination of avionics systems onboard the aircraft. Thus, depending on the type and number of avionics systems onboard a particular make and model of aircraft, the pilot behavior and corresponding modeling data 220 may vary to reflect the different avionics capabilities onboard that particular instance of aircraft.

Figure 4:
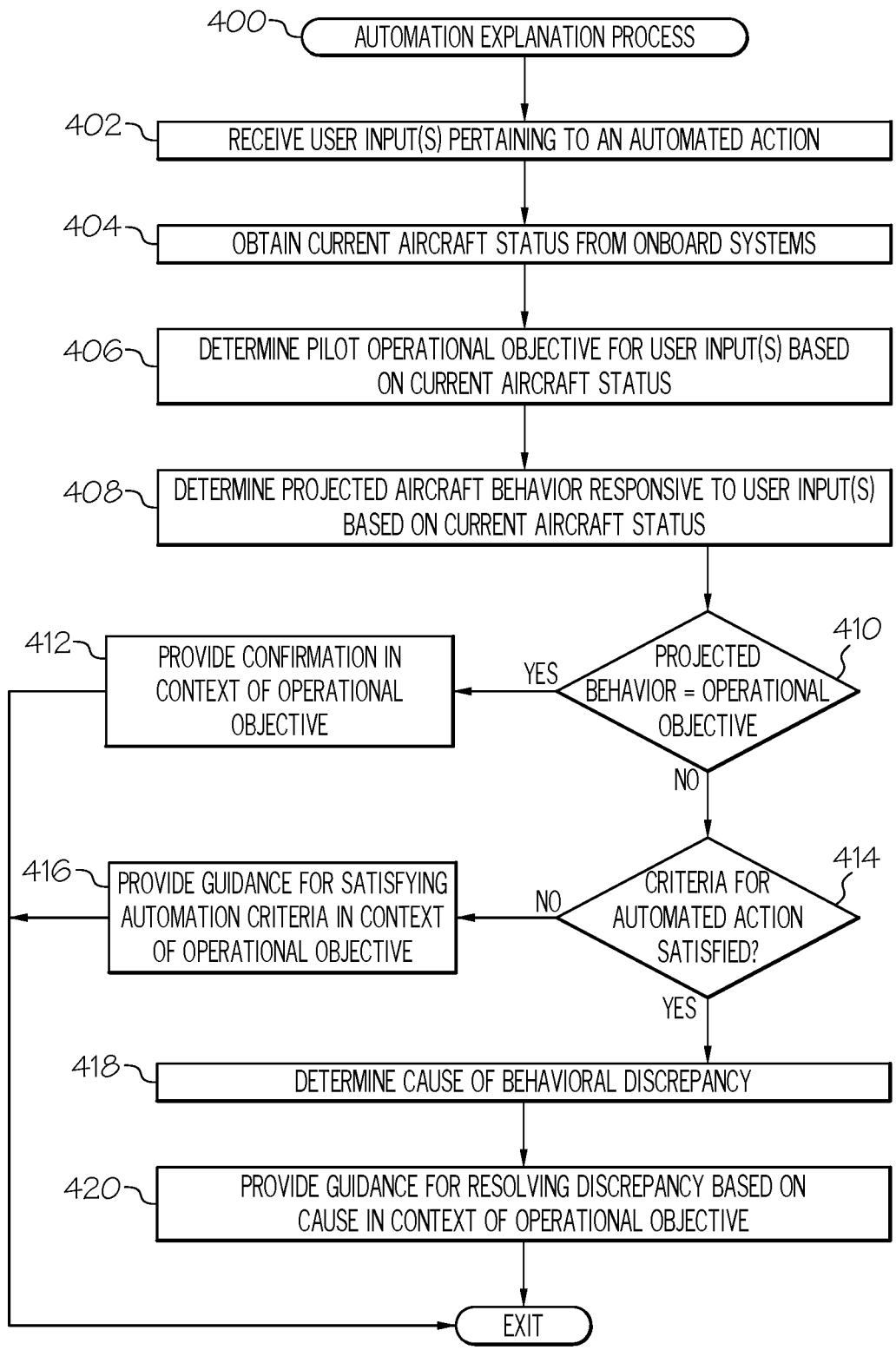
FIG. 4 is a flow diagram of an exemplary automation explanation process suitable for use with the aircraft system of FIG. 1 or the automation guidance system of FIG. 2 in conjunction with the pilot modeling process of FIG. 3 in accordance with one or more embodiments.

Referring now to FIG. 4, in an exemplary embodiment, the system 100 and/or the automation guidance system 200 is configured to support an automation explanation process 400 and perform additional tasks, functions, and operations described below. The various tasks performed in connection with the illustrated process 400 may be implemented using hardware, firmware, software executed by processing circuitry, or any combination thereof. For illustrative purposes, the following description may refer to elements mentioned above in connection with FIGS. 1-2. In practice, portions of the automation explanation process 400 may be performed by different elements of the systems 100, 200; that said, for purposes of explanation, the automation explanation process 400 may be described herein primarily in context of being performed primarily by some combination of the navigation system 112, the FMS 114, one or more onboard avionics systems 116, and/or the processing system 106, 202, and in particular, by the pilot modeling application 210, the automation modeling application 212, and the automation guidance application 214 executed, generated, or otherwise implemented thereby. It should be appreciated that the automation explanation process 400 may include any number of additional or alternative tasks, the tasks need not be performed in the illustrated order and/or the tasks may be performed concurrently, and/or the automation explanation process 400 may be incorporated into a more comprehensive procedure or process having additional functionality not described in detail herein. Moreover, one or more of the tasks shown and described in the context of FIG. 4 could be omitted from a practical embodiment of the automation explanation process 400 as long as the intended overall functionality remains intact.

In the illustrated embodiment, the automation explanation process 400 initiates or begins in response to receiving one or more user inputs pertaining to an automated action that the pilot would like to activate, configure, engage, or otherwise initiate and receives or otherwise obtains current status information for the aircraft corresponding to the user inputs (tasks 402, 404), in a similar manner as set forth above in the context of FIG. 3 (e.g., tasks 302 and 304). The automation explanation process 400 identifies or otherwise determines a pilot's operational objective corresponding to the user inputs based on the current aircraft status (task 406), for example, by performing the pilot modeling process 300 of FIG. 3.

The automation explanation process 400 also calculates or otherwise determines a projected aircraft behavior responsive to the user inputs based on the current aircraft status and then compares the projected aircraft behavior to the pilot's operational objective to verify the projected aircraft behavior corresponds to or otherwise aligns with the pilot's intent (tasks 408, 410). In this regard, the automation modeling application 212 calculates or otherwise determines the likely result of the user inputs based on the current aircraft status and the current status of the FMS 114 and other onboard avionics systems 108, 110, 112, 116, 206. For example, based on the value or state of the user inputs, the automated action attempted to be activated, engaged, or otherwise initiated, and the activation criteria or prerequisites associated with that automated action, the automation modeling application 212 determines whether the automated action can be performed, and if so, what the likely result of the automated action will be based on the value or state of the user inputs. In this regard, when one or more activation criteria or prerequisites associated with that automated action are unsatisfied, the automation modeling application 212 determines that the projected aircraft behavior corresponds to the current aircraft behavior, that is, the automation modeling application 212 projects operation of the aircraft 120 based on the assumption that the user inputs will not change or influence the current operation of the aircraft.

In one or more embodiments, the activation criteria or prerequisites associated with that automated action requires that one or more other automated actions, autonomous operating modes, or other avionics systems 108, 110, 112, 116, 206 be in a particular state, and the automation modeling application 212 ensures that the current status for such automated actions, autonomous operating modes, or avionics systems corresponds to the allowed status before projecting the aircraft behavior. When another automated action, operating mode, or avionics system is in a disallowed state, the automation modeling application 212 provides an output indicative of the violating automated action, autonomous operating mode, or avionics system and its current state. Additionally, if the activation criteria or prerequisites associated with that automated action requires a particular user input value, state, or range thereof, the automation modeling application 212 ensures that the current user input satisfies the applicable criteria before projecting the aircraft behavior, and if not, the automation modeling application 212 provides an output indicative of the violating user input value.

In exemplary embodiments, the automation guidance application 214 compares the projected aircraft behavior in response to the user inputs to the pilot's operational objective to verify the projected aircraft behavior corresponds to the pilot's operational objective. For example, if the pilot's operational objective is to descend to a particular altitude and the projected aircraft behavior is to descend to that altitude (or an altitude substantially equal thereto), the automation guidance application 214 determines the projected aircraft behavior and the pilot's operational objective match or are otherwise aligned. Similarly, if the pilot's operational objective is to proceed to a particular location and the projected aircraft behavior is to fly towards that location or at a heading substantially aligned towards that location, the automation guidance application 214 determines the projected aircraft behavior and the pilot's operational objective match or are otherwise aligned. Conversely, when the automation guidance application 214 determines that the projected aircraft behavior deviates from the pilot's operational objective, the automation guidance application 214 determines that a discrepancy exists and the projected aircraft behavior and the pilot's operational objective are not aligned or do not match.

Still referring to FIG. 4, in the illustrated embodiment, when the projected aircraft behavior matches the pilot's operational objective, the automation explanation process 400 generates or otherwise provides confirmation of the automated action in a manner that is influenced by the pilot's operational objective (task 412). In this regard, the automation guidance application 214 may provide an indication or notification via an output device 102, 105, 205 that indicates to the pilot that the automated action will be activated or otherwise performed in accordance to the pilot's operational objective (e.g., "VNAV to descend from TOD," "Direct to waypoint ABC," or the like). The confirmation guidance may also account for the current aircraft status and/or reflect the current location of the aircraft 120 within the flight plan. Providing confirmation guidance may assure the pilot that the operational objective will be achieved while also confirming the automated action will be performed, which, in turn, increases the pilot's understanding and confidence in the automation scheme and may improve situational awareness by reducing stress and obviating the need for the pilot to divert attention to confirming the automated action will achieve the pilot's objective.

In the illustrated embodiment, when the projected aircraft behavior and the pilot's operational objective are not aligned, the automation explanation process 400 determines whether activation criteria or prerequisites for the automated action are satisfied, and if not, generates or otherwise provides guidance information that indicates one or more remedial actions that may be performed to satisfy the criteria and thereby facilitate the automated action in the context of the pilot's operational objective (tasks 414, 416). In this regard, when the automation modeling application 212 indicates one or more criterion for the automated action are not satisfied, the automation guidance application 214 generates guidance information that indicates remedial action(s) that may be performed by the pilot to satisfy one or more of the criterion. For example, if another automated action, autonomous operating mode or avionics system status conflicts with the attempted automated action by the pilot inputs, the automation guidance application 214 may indicate how the pilot could modify or reconfigure such automated action, autonomous operating mode, or avionics system to increase the likelihood of achieving the pilot's operational objective. Similarly, when the automation modeling application 212 indicates the user input does not satisfy a criterion for the automated action, the automation guidance application 214 generates guidance information that indicates the user input needs to be modified or provided by the pilot to achieve the pilot's operational objective.

In the illustrated embodiment, when the activation criteria or prerequisites for the automated action are satisfied, the automation explanation process 400 identifies or otherwise determines a cause for the discrepancy between the projected aircraft behavior and the intended aircraft behavior according to the pilot's operational objective and generates or otherwise provides guidance information identifying one or more remedial actions for resolving the discrepancy based on the cause in the context of the pilot's objective (tasks 418, 420). For example, if the projected aircraft behavior is to climb and the pilot's operational objective is to descend, the automation guidance application 214 may analyze the user input or the projected aircraft behavior to determine that the user input value or state provided by the pilot may be erroneous and provides a corresponding indication that the user input may need to be modified to achieve the pilot's operational objective (e.g., "lower ASEL to descend"). Thus, by virtue of determining the pilot's operational objective in the context of the current aircraft status, the automation explanation process 400 may detect or otherwise identify potentially erroneous user inputs substantially in real-time and in a manner that allows the pilot to quickly remedy any errors and resolve any discrepancies before any significant negative impacts occur (e.g., by eliminating the delay associated with the pilot recognizing an error).

To briefly summarize, the subject matter described herein attempts to ascertain the pilot's operational objective or intended result of the requested automated action, or continuation of automated action, and provide guidance to the pilot in response to any differences or discrepancies between the pilot objective and the projected aircraft behavior or expected response to the pilot's input(s) requesting the automated action. Thus, if the projected response to the user input(s) do not align with, match, or otherwise correspond to the pilot objective (e.g., requesting an automated action that is not currently available or a request that does not comply with criteria associated with the requested automated action), the pilot may be notified of the potential discrepancy between the projected aircraft behavior and the determined pilot objective and potential remedial action(s) for resolving the discrepancy. As a result, the pilot's understanding of the onboard automation may be improved. Additionally, the guidance is provided in the context of the determined pilot objective and/or the current operational context of the aircraft with respect to the flight plan, which, in turn further facilitates the pilot's ability to understand the automation behavior. Clearance instructions and other context information may also be leveraged or utilized to further improve the accuracy and reliability of the determined pilot objective.

For the sake of brevity, conventional techniques related to flight management systems (FMSs) and other avionics systems, autopilot or other autonomous or automated aircraft behaviors, flight planning, behavioral analysis, aircraft or flight modeling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of operating an aircraft, the method comprising:
    obtaining, by a processing system, one or more user inputs to initiate an automated action to be performed by an autonomous mode of an onboard avionics system, wherein the automated action comprises the onboard avionics system autonomously adjusting a mechanical or electrical configuration of an onboard component to influence at least one of a trajectory, a path, or a speed of the aircraft;
    obtaining, by the processing system, current status information for the aircraft from a second onboard avionics system;
    determining, by the processing system, an operational objective of a user corresponding to the one or more user inputs pertaining to the automated action based at least in part on the current status information obtained from the second onboard avionics system using pilot modeling data;
    determining, by the processing system, a projected aircraft behavior resulting from an anticipated response by the onboard avionics system to the one or more user inputs for the automated action based at least in part on the current status information obtained from the second onboard avionics system and the one or more user inputs using automation rules data associated with the automated action by the autonomous mode of the onboard avionics system;
    identifying, by the processing system, a difference between the projected behavior and an intended aircraft behavior according to the operational objective when a criterion for the automated action is unsatisfied; and
    in response to identifying the difference between the projected behavior and the intended aircraft behavior, providing, by the processing system via a user interface, indication of a remedial action that may be performed by the user to satisfy the criterion to enable the automated action by the autonomous mode of the onboard avionics system achieving the operational objective of the user.

2. The method of claim 1, further comprising obtaining, by the processing system, clearance instructions for the aircraft, wherein determining the operational objective comprises determining the operational objective based on the one or more user inputs, the clearance instructions, and the current status information.

3. The method of claim 1, further comprising determining the criterion associated with the automated action is unsatisfied based on the current status information, wherein the indication comprises an indication of a remedial action with respect to operation of the aircraft to satisfy the criterion and achieve the operational objective.

4. The method of claim 1, further comprising determining the criterion associated with the automated action is unsatisfied based on the one or more user inputs, wherein the indication comprises an indication of a remedial action with respect to the one or more user inputs to satisfy the criterion and achieve the operational objective.

5. The method of claim 1, wherein:
    determining the operational objective comprises determining the operational objective is a likely operational objective for the one or more user inputs based on a correlation between the one or more user inputs, the current status information, and a corresponding aircraft behavior using the pilot modeling data; and
    determining the projected aircraft behavior comprises determining a likely result of the one or more user inputs based on the current status information and a current status of one or more onboard avionics systems.

6. The method of claim 1, the current status information comprising a current location of the aircraft along a predefined route of travel, wherein determining the operational objective comprises determining an intent for the automated action based on the one or more user inputs at the current location along the predefined route of travel.

7. The method of claim 6, the predefined route of travel comprising a flight plan, wherein determining the intent comprises determining a pilot's intended result of the automated action based on the one or more user inputs at the current location within the flight plan.

8. The method of claim 5, wherein the indication comprises guidance information for enabling the automated action.

9. A non-transitory computer-readable medium having computer-executable instructions stored thereon that, when executed by the processing system onboard the aircraft, cause the processing system to perform the method of claim 1.

10. A method of operating an aircraft, the method comprising:
    obtaining, by a processing system, one or more user inputs for an automated action to be performed by a first avionics system onboard the aircraft adjusting a mechanical or electrical configuration of an onboard component to influence at least one of a trajectory, a path, or a speed of the aircraft;
    obtaining, by the processing system, current status information for the aircraft from a second avionics system onboard the aircraft;
    determining, by the processing system, a pilot objective based at least in part on the current status information obtained from the second avionics system and the one or more user inputs for the automated action using pilot modeling data;
    determining, by the processing system, a projected aircraft behavior resulting from an anticipated response of the first avionics system to the one or more user inputs for the automated action based at least in part on the current status information and the one or more user inputs using automation rules data associated with the automated action by the first avionics system; and
    in response to identifying a difference between the projected aircraft behavior and an intended aircraft behavior according to the pilot objective when a criterion for the automated action is unsatisfied, providing indication of a remedial action that may be performed by a pilot to resolve the difference between the between the projected aircraft behavior and the intended aircraft behavior in the context of the pilot objective and satisfy the criterion to enable the automated action by the first avionics system.

11. The method of claim 10, the current status information comprising a current flight phase for the aircraft, wherein determining the pilot objective based on the current status information and the one or more user inputs for the automated action comprises determining the pilot objective based on a correlation between historical data associated with the current flight phase and the one or more user inputs.

12. The method of claim 10, the current status information comprising a current location of the aircraft relative to a reference point, wherein determining the pilot objective based on the current status information and the one or more user inputs for the automated action comprises determining the pilot objective based on a correlation between historical data associated with the reference point and the one or more user inputs.

13. The method of claim 10, the current status information comprising a current flight phase for the aircraft and a current location within a flight plan, wherein determining the pilot objective comprises determining the pilot objective based on a correlation between a likely objective at the current flight phase at the current location within the flight plan and the one or more user inputs.

14. The method of claim 1, wherein the indication comprises guidance information indicating how to modify another automated action, another autonomous operating mode or another avionics system that conflicts with the automated action by the autonomous mode of the onboard avionics system to enable the automated action.

15. The method of claim 1, the criterion comprising activation criteria or prerequisites associated with the automated action by the autonomous mode of the onboard avionics system, wherein the indication comprises guidance information indicating the one or more user inputs need to be modified to satisfy the activation criteria or prerequisites associated with the automated action to enable the automated action by the autonomous mode of the onboard avionics system.

16. The method of claim 10, wherein determining the projected aircraft behavior comprises determining whether the first avionics system will perform the automated action in response to the one or more user inputs.

17. An aircraft system comprising:
    a first avionics system onboard an aircraft capable of performing an automated action by autonomously adjusting a mechanical or electrical configuration of an onboard component to influence at least one of a trajectory, a path, or a speed of the aircraft;
    a second avionics system onboard the aircraft to provide current status information for the aircraft;
    one or more user input devices to receive one or more user inputs for the automated action;
    an output device;
    a data storage element to maintain pilot modeling data and automation rules data associated with the automated action; and
    a processing system coupled to the second avionics system, the one or more user input devices, the data storage element, and the output device to:
        determine a pilot objective based on a correlation between the current status information and the one or more user inputs for the automated action using the pilot modeling data;
        determine a projected aircraft behavior resulting from an anticipated response by the first avionics system to the one or more user inputs for the automated action based at least in part on the current status information and the one or more user inputs using the automation rules data associated with the automated action;
        identify a difference between the projected behavior and an intended aircraft behavior according to the pilot objective when a criterion for the automated action is unsatisfied; and
        in response to identifying the difference between the projected behavior and the intended aircraft behavior, provide, via the output device, indication of a remedial action that may be performed by a pilot to resolve a difference between the projected aircraft behavior and the intended aircraft behavior according to the pilot objective in the context of the pilot objective.

18. The method of claim 1, wherein:
    the current status information comprises at least one of a current location of the aircraft within a flight plan, a current location of the aircraft relative to a departure location, a current location of the aircraft relative to a destination location, a current location of the aircraft relative to a waypoint, and a current phase of flight of the aircraft;

the one or more user inputs pertain to programming or configuring the automated action; and determining the operational objective comprises determining the operational objective based at least in part on one or more of a number of the one or more user inputs, a type of the one or more user inputs, and a content of the one or more user inputs.

19. The method of claim 18, wherein:

the pilot modeling data includes historical data for one or more previous flights that maintains associations between previously received user inputs and a respective segment or phase of the flight during which the respective user inputs were received, respective navigational reference points or milestones within the flight plan or distances relative thereto when the respective user inputs were received, respective aircraft configuration data or other data characterizing or quantifying the current status of one or more onboard systems when the respective user inputs were received, and a respective resultant automated action that the respective user inputs initiated;

determining the operational objective comprises determining the operational objective based on a correlation between the one or more of the number of the one or more user inputs, the type of the one or more user inputs, and the content of the one or more user inputs and the at least one of a current location of the aircraft within the flight plan, the current location of the aircraft relative to the departure location, the current location of the aircraft relative to the destination location, the current location of the aircraft relative to the waypoint, and the current phase of flight of the aircraft, and a corresponding aircraft behavior using the pilot modeling data; and the indication comprises guidance information for enabling the automated action.

20. The aircraft system of claim 17, further comprising a data storage element to maintain clearance data, wherein the processing system determines the pilot objective based on the clearance data, the current status information, and the one or more user inputs for the automated action.

\* \* \* \* \*